United States Patent [19]

King

[11] Patent Number: 4,512,333

[45] Date of Patent: Apr. 23, 1985

[54] SOLAR COLLECTOR PANEL AND METHOD

[75] Inventor: Wladimir S. King, Mechanicsburg, Pa.

[73] Assignee: Kimex International Technologies, Inc., Mechanicsburg, Pa.

[21] Appl. No.: 496,908

[22] Filed: May 23, 1983

[51] Int. Cl.³ .............................................. F24J 3/02
[52] U.S. Cl. ............................ 126/429; 126/445; 126/449; 126/452
[58] Field of Search ............... 126/429, 444, 445, 446, 126/449, 450, 452; 165/168, 169, 170

[56] References Cited

U.S. PATENT DOCUMENTS

| | | | |
|---|---|---|---|
| 2,601,905 | 7/1952 | Anderegg | 126/429 X |
| 3,894,685 | 7/1975 | Keyes et al. | 126/449 |
| 4,016,861 | 4/1977 | Taylor | 126/446 X |
| 4,085,728 | 4/1978 | Tomchak | 165/170 X |
| 4,090,494 | 5/1978 | Borst et al. | 126/445 |
| 4,099,513 | 7/1978 | Skrivseth | 126/449 |
| 4,156,419 | 5/1979 | Lewis | 165/170 X |
| 4,262,659 | 4/1981 | Brzezinski | 126/449 |
| 4,266,531 | 5/1981 | Behrendt et al. | 126/449 |
| 4,270,516 | 6/1981 | Hopper et al. | 126/417 |
| 4,284,070 | 8/1981 | Wilke | 126/450 |
| 4,289,117 | 9/1981 | Butcher | 126/449 X |
| 4,297,990 | 11/1981 | Allisbaugh | 126/445 |
| 4,313,429 | 2/1982 | McAlaster | 126/445 |
| 4,314,544 | 2/1982 | Muller et al. | 126/417 |
| 4,319,559 | 3/1982 | Hermann et al. | 126/449 X |
| 4,364,375 | 12/1982 | Younghouse | 126/444 |
| 4,426,997 | 1/1984 | Bette et al. | 165/170 X |

Primary Examiner—Margaret A. Focarino
Attorney, Agent, or Firm—Thomas Hooker

[57] ABSTRACT

A solar collector panel having a solar energy collector plate and means for flowing a fluid along one side of the plate in a perpendicular serpentine path so that the fluid is repetitively moved toward and away from the plate as it moves along the plate.

17 Claims, 5 Drawing Figures

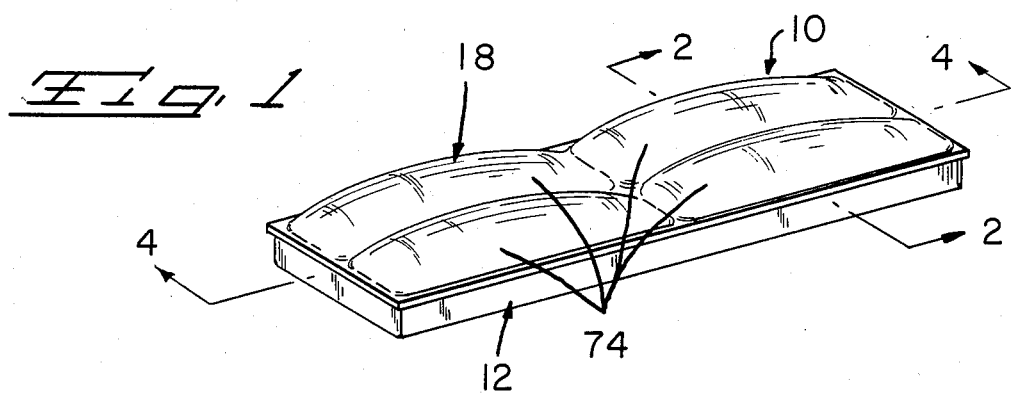
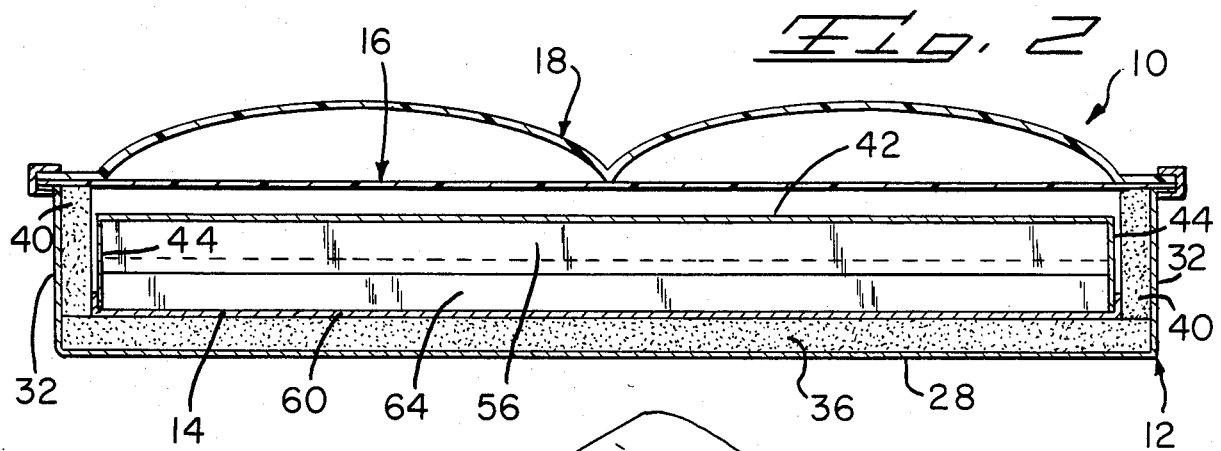
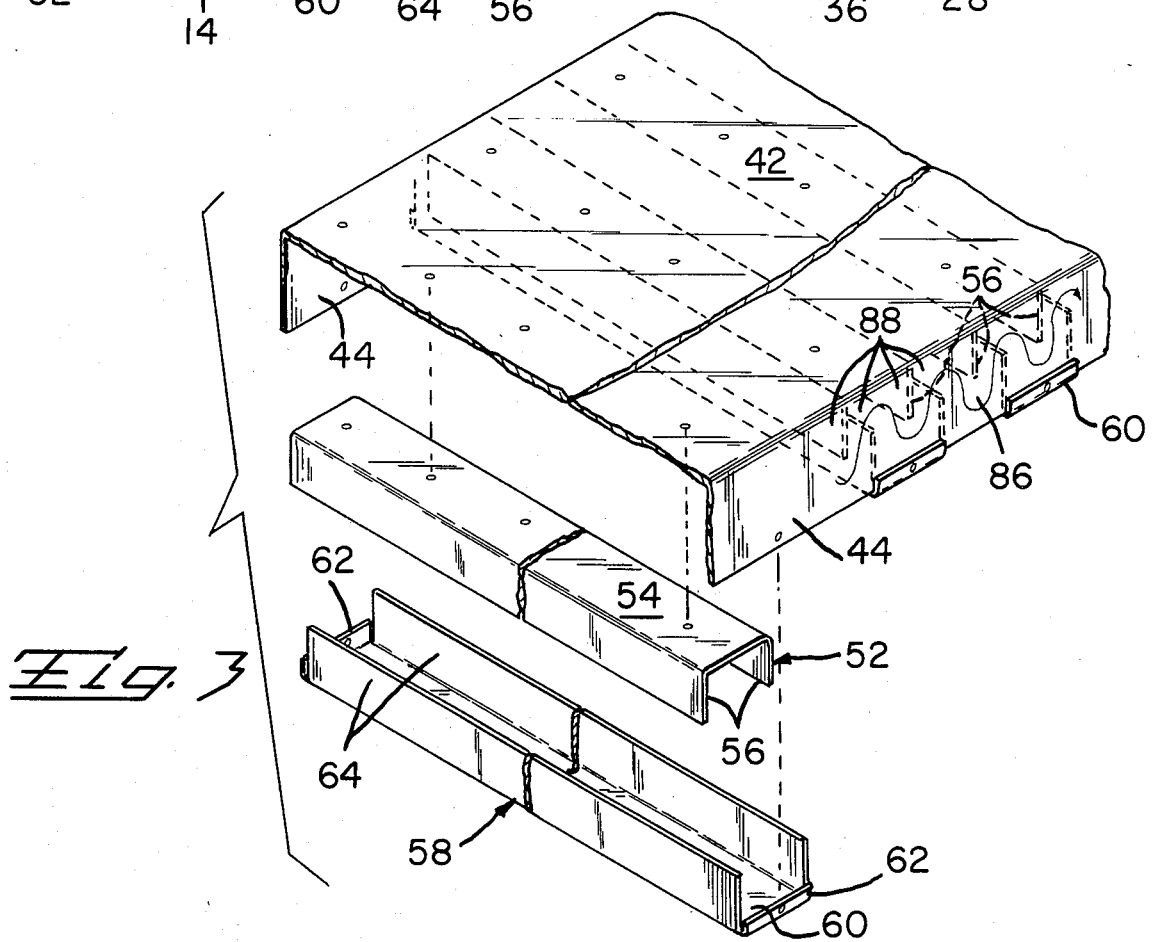

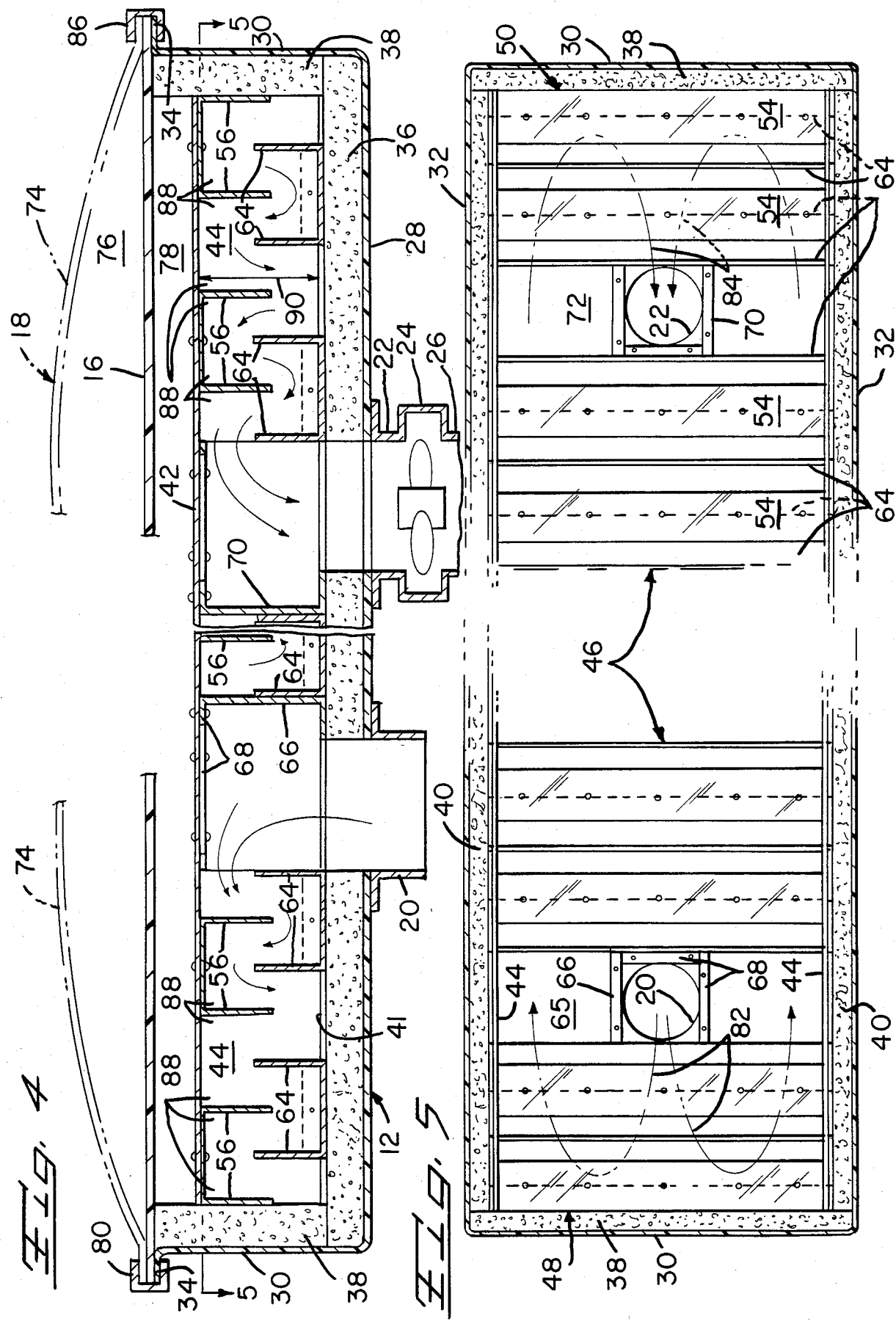

SOLAR COLLECTOR PANEL AND METHOD

The invention relates to an improved solar collector panel and method where solar energy strikes and heats one side of a collector plate and a fluid is flowed along the opposite side of the collector plate in a serpentine path perpendicular to the plate so that the fluid is repetitively moved toward and away from the plate as it is flowed in a direction along the plate. The perpendicular serpentine flow path is defined by a wall spaced from the plate and a series of spaced, intermeshed fins extending alternately from the collector plate and from the wall. The ends of the fins extend past each other to force the fluid flowed along the plate into the desired perpendicuar serpentine path.

Solar collector panels including collector plates with baffles or fins for channeling the flow of the fluid to be heated in a serpentine path extending parallel to the collector plate are well known in U.S. Pat. Nos. 4,085,728, 4,156,419, 4,262,659, and 4,314,544.

U.S. Pat. No. 4,297,990 discloses a panel of this type where guides extend from the plate to define a serpentine air flow path parallel to the back of the collector plate. U.S. Pat. Nos. 4,266,531, 4,270,516, 4,284,070, 4,313,429 disclose hot air solar collector panels where air is flowed through a path on the back of a collector plate or light transmitting cover and past specialized members which deflect the flow for improved heat exchange.

In contrast to conventional solar collector panels, the collector panel of the present invention flows a fluid along a collector plate in a perpendicular serpentine path so that the fluid is repetitively moved toward and away from the plate as it is flowed along the plate. The perpendicular serpentine flow path is defined by spaced fins extending away from the collector plate and away from the opposite side of the flow path beneath the plate. The collector plate and fins extending from the plate are heated by solar energy. The fluid moved along the perpendicular flow path is brought into turbulent contact with the heated plate and fins. This contact efficiently transfers heat from the plate and fins to the fluid, resulting in high efficient utilization of available solar energy. Tests of a hot air solar collector panel using a perpendicular serpentine flow path showed an instantaneous efficiency of 45.7 percent as measured by ASHRAE Standard 93-77. The efficiency of the panel is further increased by increasing the spacing between the fins, thereby reducing the pressure drop between the inlet and outlet ports. The anticipated efficiency of a solar collector panel with a reduced pressure drop may be as great as 60 percent.

Other objects and features of the invention will become apparent as the description proceeds, especially when taken in conjunction with the accompanying drawings illustrating the invention, of which there are 2 sheets and one embodiment.

IN THE DRAWINGS:

FIG. 1 is a perspective view of a solar collector panel according to the invention;

FIG. 2 is a sectional view taken along line 2—2 of FIG. 1;

FIG. 3 is an exploded view of part of the collector assembly of the panel;

FIG. 4 is a sectional view taken along line 4—4 of FIG. 1; and

FIG. 5 is a sectional view taken along line 5—5 of FIG. 4.

A hot air solar collector panel 10 includes a molded rectangular plastic body 12, a collector assembly 14 within body 12 and a pair of light transmitting covers 16 and 18 overlying the top of the collector assembly. Ambient air inlet port 20 extends through the bottom of body 12 at one end and hot air outlet port 22 extends through the bottom of the body at the opposite end of the panel. A perpendicular serpentine air flow path within the collector assembly communicates the inlet and outlet ports 20 and 22 such that fan 24 on the outlet port draws ambient air into the panel, through the assembly and discharges the air out fan discharge duct 26.

Panel body 12 is preferably molded from a high impact plastic material and includes an elongate rectangular bottom wall 28, opposed end walls 30 and elongate side walls 32. Peripheral lip 34 extends around the circumference of the body at the top of the walls 30 and 32. Sheets of thermal insulation material 36, 38 and 40 are fitted within the body against the bottom, end and side walls as illustrated. The tops of the sheets 38 and 40 are flush with the top of the lip 34. The internal surfaces of the insulating material may be made of aluminum foil.

Rectangular collector assembly 14 fits snugly within the insulated recess 41 in body 12 defined by insulation 36, 38 and 40 and includes an outwardly facing flat aluminum collector plate 42. Plate 43 closes the insulated interior recess 42 approximately one inch below the top of the lip 34. The upper surfaces of the plate 42 is preferably provided with a black, non-selective coating for absorbing solar energy. The sides 44 of the collector plate extend down along insulation side walls 40 to insulation bottom wall 36.

The collector assembly 14 includes a central heat exchange section 46 located between the inlet and outlet ports 20 and 22, an inlet heat exchange section 48 located between the inlet port 20 and the adjacent end insulation 38 and an outlet heat exchange section 50 located between the outlet port 22 and the adjacent body end insulation 38. Each heat exchange section 46, 48, and 50 fills the space between the collector plate 42 and insulating body 36 and the space between the collector plate side walls 44. Air flowing through these sections is guided by a series of intermeshed U-shaped channel members which make up the sections. The channel members extend across the width of the collector panel 10 between collector plate side walls 44.

Upper channel members 52 in each of the three sections 46, 48 and 50 include a flat base 54 secured flush against the collector plate 42 by a suitable means such as rivets or the like. The fins or legs 56 of the upper channel members extend perpendicularly away from the collector plate. Lower channel members 58 each include a base 60 having tabs 62 at the ends of the base which are bent up over the edges of the collector plate side walls 44 and secured to the side walls by suitable fasteners, such as rivets. The legs or fins 64 of the lower channel members extend perpendicularly toward the collector plate 42, parallel to fins 56.

The upper and lower channel members 52 and 58 have the same cross section and are alternately spaced longitudinally along the length of the collector assembly so that one fin of each channel member is located centrally between the two fins of a channel member on the opposite side of the assembly. In this way, the channel members extend across the full width of the collector assembly in spaced intermeshed pairs. Away from the ends of the heat exchange sections, the other fin of each channel member is located equidistance between the adjacent fins of the opposite two adjacent channel members. The ends of the fins on opposed channel members extend past each other to assure that air flowed through the assemblies is repetitively moved toward and away from the plate 42 as it is moved from the inlet port to the outlet port.

The air inlet port 20 extends through openings formed in the bottom of body 12 and insulating material 36 and opens into the space 65 in the interior of the assembly between the central and inlet heat exchange sections. Port 20 opens into an inlet flow guide 66 which extends around the inlet on three sides from the collector plate to the insulating material 36 and is open facing the inlet heat exchange section 48. The flow guide is secured to the collector plate 42 by suitable attachment means, such as rivets, extending through the plate and 90 degree tabs 68 at top of the plate.

An outlet flow guide 70 like guide 66 surrounds the outlet port 22 in space 72 between the central heat exchange section and outlet heat exchange section. The outlet guide 70 is open facing the outlet heat exchange section. Guide 70 is attached to the collector plate in the same way as guide 66 is attached to the collector plate. As shown, in FIG. 5, each guide opens adjacent the innermost fin of the inlet or outlet exchange section and the back of the guide is adjacent the end fin of the central heat exchange section. In this way, the width of the sections 64 and 72 is minimized. The spaces in sections 62 and 72 to either side of the flow guides may be filled with pairs of intermeshed upper and lower channel members as previously described with the exception of these members would not extend across the full width of the collector assembly. Such additional channel members would increase the pressure drop between the inlet and outlet ports.

The inlet and outlet ports 20 and 22 are spaced from the ends 30 of the panel in order to facilitate permanent installation of the panel. The inlet and outlet heat exchange sections 48 and 50 assure that the air flowed through the panel is heated by the available solar energy striking the ends of the plate 42 beyond the inlet and outlet ports. Solar energy striking the portions of plate 42 overlying the spaces 65 and 72 heat the adjoining portions of the panel and adjoining channel members 52 for transfer to the air flowed through the collector assembly.

The flat inner cover 16 is formed of a special scattering material designed to distribute solar energy uniformally on the collector plate. The outer transparent cover 18 is formed of molded transparent plexiglass having four elongate reverse parabolic domes 74 which aid in focusing solar energy directed at the collector panel at an acute angle and on to the collector plate. The air spaces 76 and 78 between the outer and inner covers 16 and 18 and between the inner cover 16 and the collector plate 42 aid in insulating the assembly 14 from heat loss. The edges of the covers 16 and 18 overlie peripheral body lip 34 and are mounted on the lip by a stainless steel trim strip 80 and a suitable sealant. The trim strip extends entirely around the body.

Inlet port 20 is connected by way of suitable ducting to a source of ambient air, conventionally the interior of a building to be heated by panel 10. The outlet from fan 24 is likewise connected to the building interior so that the fan draws air from the space to be heated through the collector panel where the air is heated and then returns the heated air back to the building. The operation of the fan may be controlled by a thermostat (not illustrated) located within the collector panel and operable to turn the fan on when the panel is heated to a desired operating temperature and to turn the fan off when the operating temperature falls below a threshold level. Manual override controls may also be provided.

The solar collector panel is aimed in a conventional manner toward the sun so that the sun rays strike the panel and heat the collector plate and, by conduction, the fins 56 of the upper channel attached to the plate. Fan 22 draws relatively cool ambient air into the collector assembly through inlet 20 and the inlet flow guide 66 directs the inlet air toward the inlet heat exchange section 48. As indicated by arrows 82 the air flows from the guide into the inlet heat exchange section, diverges to either side of the inlet as it travels through the section and then reverses direction and flows toward the central heat exchange section 46. The air flows past open area 65 to either side of the flow guide 66 and into and through the central heat exchange section 46. After flowing through central section 46 the air flows past open section 72 to either side of the outlet port 22 and into the outlet heat exchange section 50 where the air converges to the center of the outlet section, is drawn into the outlet flow guide 70, through the outlet port 22 and to the fan for delivery by a duct system to the volumn to be heated. See arrows 84.

As air is drawn through the heat exchange sections 46, 28 and 50 the air is moved through a flow path defined by the spaced intermeshed fins 56 and 64 so that the air is moved in a serpentine path toward and away from plate 42 as it moves in a longitudinal direction along the plate, disregarding lateral movement as it passes from inlet to outlet ports. In FIG. 3, arrow 86 illustrates the serpentine flow of the air through the central heat exchange section. As air is flowed longitudinally along the collector assembly it is moved alternately away from and back toward the collector plate by fins 56 and 64. The movement brings the air into intimate turbulent contact with the heated fins 56, the heated channel member bases 54 and the lower surface of the heated collector plate 42. This motion of the air past the heated members results in an efficient transfer of solar energy collected by the plate to the thermal energy in the air. The energy transfer is believed enhanced by turbulent eddying of the air in the flow path corners 88 to either side of the fins 56 at the collector plate.

The air flowed through the panel may also be heated by collector plate sides 44 and guides 66 and 70, plate 42 above spaces 64 and 72. The energy supplied by these members is considerably less than the energy supplied by movement along the perpendicular serpentine path.

The pressure drop from inlet port to outlet port is reduced by spacing the fins 56 and 65 to provide an essentially constant area flow path through the exchange sections.

Preferrably the fins are spaced longitudinally by a constant distance and the end of each fin is spaced from the opposite side of the assembly by the same distance. The fins extend past each other across the thickness of the assembly to assure that the air flowed through the assembly follows the desired, efficient perpendicular serpentine path with a minimum pressure drop between the inlet and outlet ports.

The metal parts of collector assembly 14 are preferrably made of aluminum sheeting. Collector plate 42 may be formed from aluminum sheeting having thickness of 0.40 inch while the upper and lower channel members may be formed of thinner aluminum sheeting having a thickness of 0.20 inch.

Tests conducted on a hot air solar collector of the type described indicated a maximum instantaneous efficiency of 45.6 percent in accordance with ASHRAE Standard 93-77. The collector panel had an overall length of 96¼ inch, an overall width of 36⅛ inch and an overall depth of 5 5/8 inch. The gross area of the collector panel was 24.15 ft. square and the operational area of the collector plate was 21.57 square feet, approximately 90 percent of the gross area.

In the panel which was tested the height of the flow passage 90 within the collector assembly was 2¾ inch and the width of the upper and lower channel members was 1½ inch with the ends of the channel member fins extending to within ⅜ inch of the opposite side of the assembly. The fins were spaced ¾ inch apart from each other along the length of the assembly to define a ¾ inch wide flow path in the heat exchange sections. During testing, the fan used to draw air through the collector assembly had a free air capacity of about 550 cubic feet per minute. During testing, the fan drew air through the collector at the rate of about 380 cubic feet per minute. The pressure differential had about 4 inches of water between the inlet and outlet ports caused the collector plate 42 to bow inwardly.

The efficiency of the collector calculated pursuant to the ASHRAE Standard 93-77 is based on the assumption that the energy available is the energy which strikes the gross collector area. If a similar calculation were made using energy which actually is available, the energy striking the collector plate 42, the observed efficiency would be increased from 45.6 percent to about 50.6 percent.

The pressure differential between the inlet and outlet ports of the test collector is believed to result from the relatively close ¾ inch spacing between the fins and the sides of the interior of the collector assembly. Panel 10 provides a 1 inch flow path through the sections 46, 48 and 50 with the fins longitudinally spaced 1 inch apart and the ends of the fins 1 inch from the top and bottom of the interior of the assembly. This wider flow path reduces the pressure differential between the inlet and outlet ports to about 2 inches of water. The reduction of pressure differential is believed to increase the efficiency of the panel as measured by ASHRAE Standard 93-77 to about 60 percent. The efficiency of the panel, based on the actual area of the collector plate exposed to solar radiation would be increased to about 67 percent. These collection efficiencies are considerably greater than the efficiency of commercially available hot air solar panels.

The efficient heat transfer mechanism of the collector 10 is believed to make heat available for transfer to the air flow through the ¾ inch collector assembly more rapidly than the heat can be removed, resulting in thermal losses which reduce efficiency. Increasing the flow path from a ¾ inch flow path to a 1 inch flow path increases the volume of air drawn through the collector assembly with the result that a greater percentage of available energy is used to heat the air.

The perpendicular serpentine flow path of the air through the heat exchange sections very efficiently moves heat from the collector assembly despite the rapid flowing of the air through the assembly with a decreased pressure drop and assures that the air withdraws available energy from the collector assembly. In practice, the panel 10 is able to withdraw heat continuously at a high efficiency while other conventional panels operating in the same conditions would be cooled down to a temperature at which they would have to be shut off and allowed to reheat before air could again be drawn through them for heating purposes.

The flow path of the air through panel 10 involving repetitive movement toward and away from the collector plate as the air moves along the plate is referred to as a "perpendicular serpentine flow path" to differentiate the flow path from the conventional parallel serpentine flow path used in solar collectors where the air or liquid is flowed along a path arranged in a serpentine pattern on one side of the collector plate and the air or liquid is flowed parallel to the plate.

While the invention has been described in connection with hot air solar collector panels, it is not limited to solar collector panels used to heat air. The invention may be used to heat other fluids including liquids and gasses other than air.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. A solar collector panel comprising a collector plate having one side adapted to be exposed to solar energy, a wall spaced from the other side of the plate, a fluid flow passage between the plate and the wall, a first set of fins spaced along the passage and extending from the plate into the passage and a second set of fins spaced along the passage and extending from the wall into the passage, the second set of fins being located between the fins of the first set, all of said fins being generally parallel, so that fluid flowing through the passage is moved along a serpentine path repetitively toward, into contact with and away from the collector plate for improved transfer of heat from the plate to the fluid.

2. A solar collector panel as in claim 1 wherein the ends of the first set of fins extend into the passage past the ends of the second set of fins.

3. A solar collector panel as in claim 2 wherein the fins of said first set are formed of a thermal conductive material and are secured to the collector plate in heat conductive contact.

4. A solar collector panel as in claim 3 wherein the collector plate is planar and the fins in both sets of fins are oriented perpendicularly to the collector plate.

5. A solar collector panel as in claim 4 wherein the spacing between adjacent fins in each set of fins is twice the distance between the end of each fin and the opposite side of the passage, and each fin in one set is located midway between the adjacent pair of fins of the other set so that the fins define a generally serpentine flow path having an essentially uniform cross section in the direction of flow.

6. A solar collector panel as in claim 5 including a set of upper channel members each including a base and a pair of fins extending perpendicularly away from the base, connection means securing the bases of the channel members flush on the collector plate so that the fins extend perpendicularly from the plate into the passage, and a set of lower members on the wall each including a pair of spaced fins extending from the wall perpendicularly toward the collector plate, each upper channel member being associated with a lower member with a fin of one member being located between the fins of the other member.

7. A solar collector panel as in claim 6 wherein said collector plate includes bent down sidewalls at the sides of the passage and the set of lower members is secured to the sidewalls.

8. A solar collector panel as in claim 7 wherein said lower members each include a base secured at its ends to said sidewalls.

9. A solar collector panel comprising a collector plate having one side adapted to be exposed to solar energy, a wall spaced from the other side of the plate, a fluid flow passage between the plate and the wall, means in the passage for deflecting fluid flowing through the passage along a serpentine path repetitively toward, into contact with and away from the collector plate for improved transfer of heat from the plate to the fluid, inlet and outlet ports at the ends of the passage located inwardly from the ends of the collector plate, the means including an inlet section located between the inlet port and the adjacent end of the plate, a central section located between the inlet and outlet ports and an outlet section located between the outlet port and the adjacent end of the plate, and including an inlet port flow guide for directing inlet fluid toward the inlet section of the means and an outlet port flow guide for directing fluid from the outlet section of the means into the outlet port so that the passage extends from the inlet port, past the inlet port flow guide, through the inlet, central and outlet sections, and past the outlet port flow guide to the outlet port.

10. A solar collector panel comprising a collector plate having one side adapted to be exposed to solar energy, a wall spaced from the other side of the plate, a fluid flow passage between the plate and the wall, said passage having a generally rectangular transverse cross section, fins extending across the width of the passage, said fins projecting into the passage from the collector plate and from the wall opposite the collector plate, the ends of the fins on one side of the passage extending past the ends of the fins on the other side of the passage to define a serpentine flow path so that fluid flowing through the passage along the path is repetitively flowed toward, into contact with and away from the collector plate for improved transfer of heat from the plate to the fluid.

11. A solar collector panel for heating a fluid including a rectangular body open on one side, insulation on the bottom and interior walls of the body defining an insulated recess, a collector assembly fitted within the recess including a collector plate closing the top of the recess, a set of fins secured to one side of the collector plate extending downwardly into the recess and a set of fins secured to the assembly and extending from the bottom of the recess upwardly toward the collector plate between the collector plate fins, all of the fins extending across the width of the recess and being generally parallel to each other, a fluid inlet port extending through the body and insulation and opening into the recess at one end of the panel and an outlet port extending through the body and insulation and opening into the recess at the other end of the panel whereby fluid flowed through the inlet port, along the recess between the collector plate and insulation panels and out the outlet port is repetitively forced along a serpentine path toward, into contact with and away from the collector plate by the fins for improved heat transfer from the plate and fins to the fluid.

12. A collector panel as in claim 11 wherein said fins extend across the full width of the passage and are perpendicular to the collector plate.

13. A solar collector panel as in claim 12 including first additional fins between the inlet port and the adjacent end of the panel and second additional fins located between the outlet port and the adjacent end of the panel, and an inlet port fluid flow guide for directing inlet fluid from the inlet port toward the adjacent end of the panel and an outlet port fluid flow guide for receiving fluid from the opposite end of the panel and flowing such fluid to the outlet port.

14. The method of heating a fluid by solar energy comprising the steps of:
  (a) Exposing one side of a solar collector plate to the sun so that solar energy heats the plate; and
  (b) Moving a fluid along a passage on the opposite side of the solar collector plate and at the same time repetitively moving the fluid toward, into contact with and away from the plate in a serpentine path along first plate fins extending from the plate and second fins parallel to the plate fins extending toward the plate from the opposite side of the passage located between the plate fins, and forming eddys in the fluid at the junctions between the plate fins and the plate so that the fluid contacts and is heated by the plate.

15. The method of claim 14 including the step of repetitively moving the fluid perpendicularly toward and away from the plate.

16. The method of claim 15 wherein the fluid is a gas.

17. The method of claim 14 wherein the path has an essentially uniform cross sectional area along its length.

* * * * *